Figure 1:
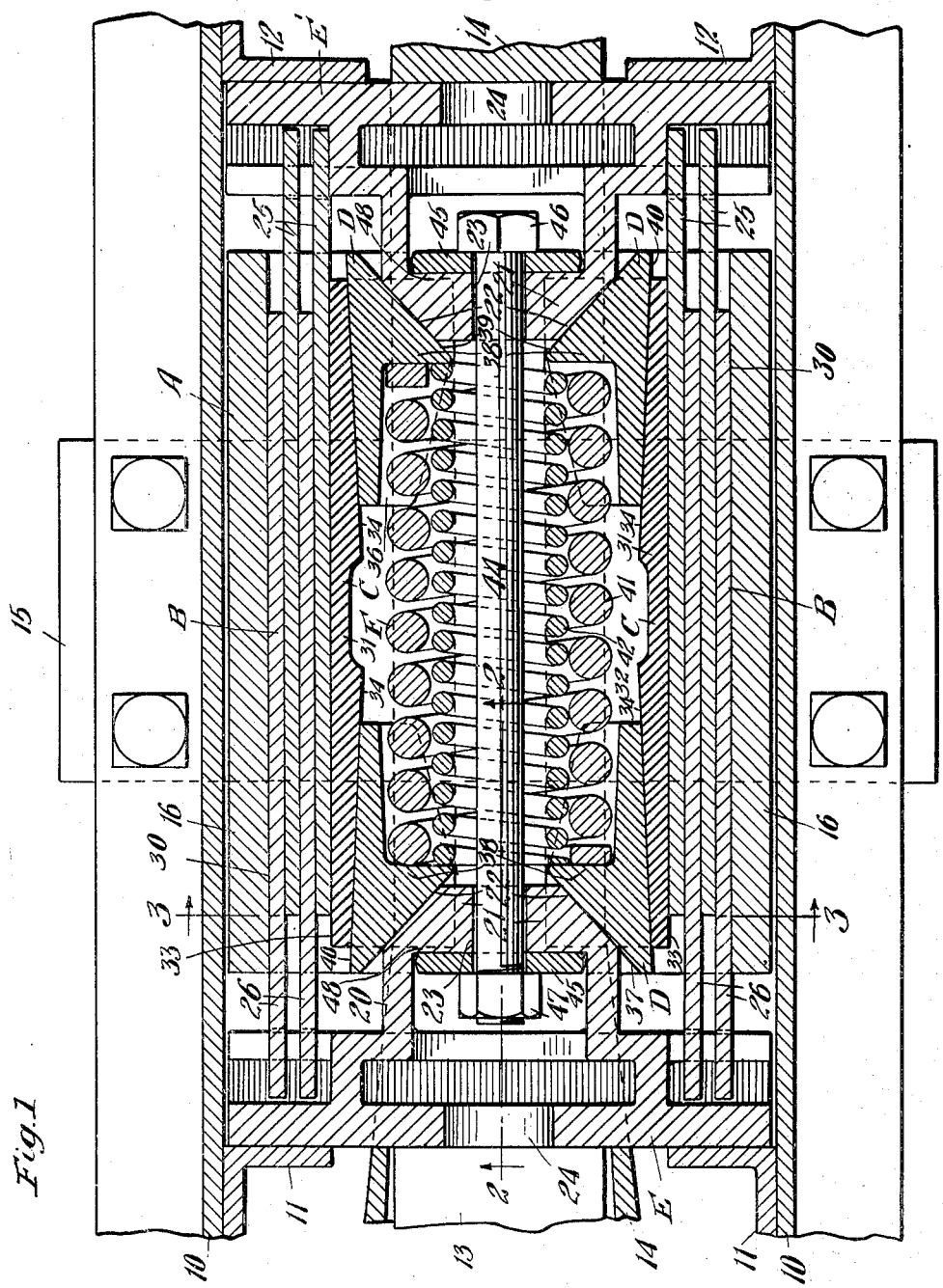

Feb. 2, 1926.  
J. F. O'CONNOR  
1,571,681  
FRICTION SHOCK ABSORBING MECHANISM  
Filed August 31, 1922  
2 Sheets-Sheet 1

Witnesses  
Wm. Geiger

Inventor  
John F. O'Connor  
By Geo. I. Haight  
His Atty.

Feb. 2, 1926.  
J. F. O'CONNOR  
1,571,681  
FRICTION SHOCK ABSORBING MECHANISM  
Filed August 31, 1922   2 Sheets-Sheet 2
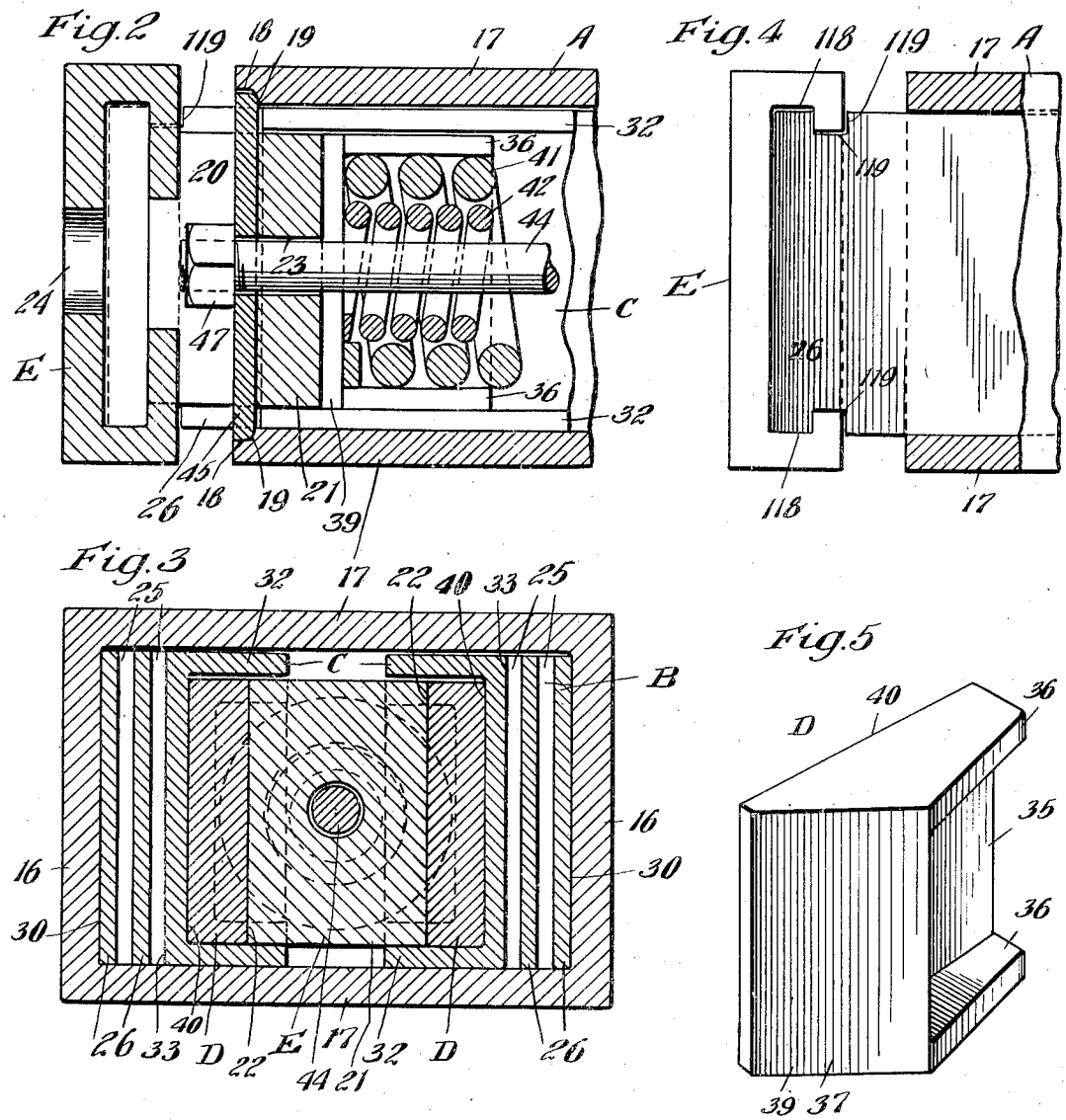

Patented Feb. 2, 1926.

1,571,681

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 31, 1922. Serial No. 585,449.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of my invention is to provide a friction shock absorbing mechanism, more particularly adapted for railway draft riggings, which is simple and effective and wherein is obtained high capacity due to large friction areas being provided.

Another object of the invention is to provide a friction shock absorbing mechanism of the intercalated friction plate type wherein the friction plates and all other parts are quickly released and positively returned to their normal position after buff or draft.

Other objects of the invention will more clearly appear from the description hereinafter following.

In the drawings forming a part of this specification, Figure 1 shows a horizontal longitudinal sectional view of a portion of a railway draft rigging showing my improvements in connection therewith. Fig. 2 shows a vertical longitudinal sectional view substantially on the line 2—2 of Fig. 1. Fig. 3 shows a vertical, transverse sectional view substantially on the line 3—3 of Fig. 1. Fig. 4 shows a side elevation of the follower and the friction shell in section illustrating the method of connecting the friction plates and the follower. And Fig. 5 is a perspective view of a combined wedge and friction shoe.

In said drawing, 10—10 indicate channel-shaped center or draft sills to the inner faces of which are secured front stop lugs 11 and rear stop lugs 12. A portion of the draw bar is indicated by 13, to which is rigidly attached a U-shaped yoke 14 of known form. The shock absorbing mechanism proper, hereinafter described, and front and rear followers, are disposed within the yoke. The movable parts of the draft rigging are adapted to be supported by a detachable saddle plate 15.

The improved shock absorbing mechanism as shown, comprises a floating friction shell A; oppositely disposed groups of friction plates B; combined wedge and friction plates C; wedge shoes D; front and rear combined wedge followers E and E'; and spring resistance F.

The friction shell A is of rectangular form and is preferably constructed of malleable iron, but may be formed of any other suitable well known material. The shell A comprises the vertically extending walls 16 connected by upper and lower walls 17. The opposite outer edges of the upper and lower walls 17 are recessed transversely as shown at 18 to provide shoulders 19 forming seats for the retaining plates hereinafter described.

The front and rear followers E and E' are preferably in the form of steel castings, but may be constructed of any other suitable material. The followers E and E', are of similar construction and, therefore, but one of the same will be described in detail. The inner faces of the follower E on opposite sides of the center are provided with undercut recesses 118, to receive the notched ends 119 of the friction plates as shown. The central portion of the follower E is formed with a hollow projection 20 forming the wedge member 21. Opposite vertical wedge faces 22 are formed on the wedge member 21. The wedge faces 22 are oppositely inclined and converge toward the center of the gear. The wedge member is centrally recessed at 23 to receive a retaining bolt hereinafter described and the follower E is provided with a recess 24 in alinement with the recess 23 through which the retaining bolt may be inserted.

In the specific embodiment of the invention herein disclosed, two groups B, of friction plates, are provided. As herein shown, each group comprises four similar flat friction plates 25 and 26.

The friction plates are attached to the followers E and E', as previously described, the plates 25 being attached to the follower E' and the plates 26 to the follower E. Said plates 25 and 26 are alternated and arranged in face to face frictional contact and preferably with a plate 26 of each group disposed outermost and in engagement with the corresponding inner longitudinally extending friction surface 30 of the shell A.

Arranged between the groups of friction plates 25 and 26 within the shell A are the two combined wedge and friction plates C.

As will most clearly appear upon reference to Figs. 1 and 3, the combined wedge and friction plates C are of channel-shape, each plate comprising a vertically extending wall 31 and inwardly extending upper and lower flanges 32 projecting therefrom. As will be noted upon reference to Fig. 1, the outer face 33 of each of the walls 31 is flat and contacts with the innermost friction plate 25 of each group. The walls 31 are provided with interior faces 34 converging with reference to the outer faces 33 from the center to the opposite ends of the combined wedge and friction plates C. The combined wedge and friction plates C are thereby each provided with two oppositely extending interior walls 34 which are inclined slightly with reference to the longitudinal axis of the gear.

The wedge shoes D are disposed within the shell A between the combined wedge and friction plates C, and the wedges 21. In the specific embodiment of the invention herein disclosed, four similar shoes D are made use of, the same being arranged in pairs which co-act with the respective wedges 21. The shoes D are best shown in Fig. 5. Each comprises a vertical wall 35 provided with upper and lower laterally extended flanges 36 terminating in an outer solid wedge portion 37 whereby an inner shoulder 38 is provided, adapted to form a seat for the spring resistance F, hereinafter described. The wedge member D is provided with a wedge face 39 corresponding with the wedge face 22 of the wedge member 21 and the outer flat face 40 of the wedge member D is slightly inclined to correspond with the inclined face 34 of the combined wedge and friction plate C.

The spring resistance F consists of an outer heavy coil 41 and an inner lighter coil 42, and the coils 41 and 42 are arranged to bear upon the shoulders 38 of the wedge shoes D to thereby hold them in their outermost position.

The parts of the shock absorbing mechanism are held in assembled relation by the retainer bolt 44 passing through the recesses 23 in the wedges 21. Retaining plates 45, of spring steel or any other suitable material, are located between the head 46 and the nut 47 on the bolt, and the corresponding inside walls 48 of the hollow projections 20 on the followers E and E'.

The plates 45 are of rectangular form and of a length vertically to extend beyond the inner faces of the walls of the shell A, and engage with the shoulders 19 on the upper and lower walls 17 of the shell to thereby retain the parts in assembled relation.

Upon reference to Figs. 1 and 2, it will be seen that the plates 25 and 26 may be properly assembled with and connected to the followers E and E' by sliding the same inwardly from the opposite sides of the followers. The springs 41 and 42 are then assembled with the wedge shoes D and the combined wedge and friction plates C, and placed within the friction shell A. The followers E and E', together with the plates 25 and 26, are then moved toward each other so that the plates 25 and 26 will alternate and be located between the outer walls 16 of the shell A and the combined wedge and friction plates C. The retainer bolt 44 is then inserted through an opening in the follower E', passing through the inner and outer springs 42 and 41, the nut 47 being then passed through the recess 24 in the follower E and threaded on the bolt 44, thereby holding the parts in assembled relation. It will be seen that by this arrangement the springs may be held under an initial compression if desired, and that the bolt 44, together with the plates 45, will limit the outward movement of the followers E and E' and hold the plates C and other parts in assembled relation.

The operation of the mechanism is as follows: During a compression stroke, one of the followers E or E' will remain stationary, depending upon the action being a buff or draft. Assuming the follower E' to remain stationary, the follower E will be moved longitudinally toward the follower E', the plates 25 remaining stationary and the plates 26 moving in unison with the follower E. As the follower E is thus moved, the wedge section thereof travels in the same direction, thus setting up a lateral wedging or spreading action on the wedge shoes D at the end adjacent the follower E. A similar action will take place at the opposite end of the mechanism between the wedge section of the follower E' and the wedge shoes D—D cooperable therewith. This simultaneous lateral spreading or wedging action at each end of the mechanism augments the lateral pressure between the alternated friction plates, thus inducing high frictional capacity. As the wedge and cooperating shoes at each end of the mechanism are forced inwardly relatively of the shell A, the shoes D are compelled to travel along the inwardly converged sets of faces 39 of the plates C, thus inducing a differential action of the shoes D which serves to further increase the lateral pressure exerted on the friction plates. In this connection, it will also be observed that the plates C, on account of their relatively thick nature, provide rigid backings for the two groups of intercalated plates, to thereby limit possibility of the groups of plates buckling at the center of the mechanism. As the two followers E and E' approach each other, the shell A will also be caused to move in the same direction as the moving follower, although it will travel only one-half the distance which the moving follower travels for a full compression stroke. By reason of the duplicated sets of spreading means and the large area of cooperating friction surfaces on the plates, I am enabled to employ comparatively blunt angles between the wedges and the shoes while at the same time obtaining the desired high capacity. Upon removal of the actuating force, the spring F is free to expand and project the follower and set of friction shoes which have been moved longitudinally, back to their normal position, the corresponding set of plates anchored to the movable follower being likewise returned to normal position. The parts will be properly centered at the end of the full release action by reason of the retaining bolt and locking plates which engage the ends of the casting A.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism; the combination with a friction shell; of a plurality of sets of intercalated relatively longitudinally movable friction plates within said shell; front and rear followers movable with reference to the shell and relatively movable with reference to each other co-acting with said plates; a spring resistance disposed between said sets of plates; and means between the opposite ends of said spring resistance and the followers for creating pressure on said sets of intercalated plates during the compressive action of the mechanism, whereby friction resistance is created between said relatively movable intercalated plates.

2. In a friction shock absorbing mechanism; the combination with front and rear followers; of a shell interposed between said followers, said shell having its opposite ends spaced from the followers; a plurality of groups of longitudinally extending relatively movable intercalated friction plates disposed within said shell between said followers; abutment means on said followers co-acting with said plates; a longitudinally extending spring resistance arranged between said sets of plates wedge-acting means between each follower and the adjacent end of the spring resistance for creating pressure on said groups of plates during the compressive action of the mechanism.

3. In a friction shock absorbing mechanism, the combination with a shell; of a plurality of groups of intercalated friction plates, the intercalated plates of each group being movable relatively to each other and adapted to be so moved during the compressive action of the mechanism; a spring resistance arranged between said groups of plates; and wedge-pressure transmitting means at opposite ends of said spring resistance and co-acting with said plates, said wedge pressure transmitting means including front and rear follower elements directly co-acting with said plates for effecting relative movement of the latter, said followers being normally out of contact with the shell.

4. In a friction shock absorbing mechanism, the combination with a plurality of intercalated friction plates longitudinally arranged with reference to said mechanism; of means for limiting lateral movement of said plates; a spring resistance also arranged longitudinally with reference to said mechanism; relatively movable front and rear followers, both movable with reference to said means, said follower directly engaging said plates for effecting movement of the same; and wedge pressure transmitting means at opposite ends of said spring resistance and co-acting with said plates to press the same into face to face contact.

5. In a friction shock absorbing mechanism; the combination with relatively movable main followers; of a friction shell open at its opposite ends; a plurality of intercalated relatively movable friction plates engaged by said followers and co-operating with the friction shell; of a spring resistance extending in the direction of movement of said plates; and wedging means co-acting with said plates, said wedging means being arranged at the opposite ends of said spring resistance.

6. In a shock absorbing mechanism; the combination with front and rear followers having wedge members moving therewith; of two groups of intercalated friction plates, each group comprising relatively movable plates carried by and movable with the front and rear followers respectively; a friction shell enclosing said groups of plates and having inner friction faces co-acting with said plates, said shell having its opposite ends normally spaced from both followers; a spring resistance arranged between said groups of plates; and wedge shoes at opposite ends of said spring resistance co-acting with said wedge members and friction plates.

7. In a friction shock absorbing mechanism, the combination with front and rear followers having wedge members moving therewith; of two groups of intercalated friction plates, each group comprising relatively movable plates carried by and movable with the front and rear followers, respectively; a friction shell enclosing said groups of plates and having inner friction faces co-acting with said plates; a spring resistance arranged between said groups of plates; wedge shoes at opposite ends of said spring resistance co-acting with said wedge members; and a combined friction and wedge member interposed between said shoes and each group of intercalated plates said member having wedge faces co-operating with the shoes at the opposite ends of the mechanism.

8. In a friction shock absorbing mechanism; the combination with a shell; of front and rear followers, said followers being relatively movable with reference to each other and said shell; wedge members moving with said followers; two groups of intercalated friction plates within said shell, each group comprising plates movable with the front and rear followers respectively; a spring resistance arranged between said groups of plates; and a pair of wedge shoes at each end of the spring resistance co-acting with said wedge members and friction plates.

9. In a shock absorbing mechanism; the combination with a friction shell; of front and rear followers both movable with reference to said shell; of friction plates connected to each of said followers and movable therewith, the plates attached to one of said followers being intercalated with the plates attached to the other of said followers, and forming groups of intercalated plates; a wedge associated with each follower, said wedge being arranged centrally between said groups of plates; a pair of wedge shoes co-acting with each of said wedges and adapted to exert pressure on said groups of friction plates; and a spring resistance arranged between said groups of plates and bearing at each end on one of said pairs of wedge shoes.

10. In a friction shock absorbing mechanism; the combination with front and rear followers; of a shell normally spaced from both of said followers; a plurality of sets of friction plates connected to each of said followers and movable therewith, the plates of each set on one of said followers being intercalated with the plates of a corresponding set of the other of said followers, thereby forming groups of intercalated plates; a spring resistance between said groups of friction plates; and wedge pressure transmitting means at opposite ends of said spring resistance, co-acting with said followers and groups of friction plates.

11. In a friction shock absorbing mechanism, the combination with front and rear followers; of a casing; spaced apart groups of intercalated relatively movable friction plates within said casing, alternate plates of said groups projecting beyond the opposite ends of said shell respectively and being connected to the front and rear follower respectively to move therewith; a spring resistance between said groups of friction plates; and wedge pressure transmitting means at opposite ends of said spring resistance, co-acting with said friction plates and adapted to be actuated by said follower during compressive action of said mechanism, whereby frictional resistance is created between said relatively movable intercalated plates.

12. In a friction shock absorbing mechanism, the combination with front and rear follower members, each having a plurality of longitudinally extending friction plates anchored thereto, said plates being alternated and divided into two separated groups; means for limiting lateral movement of said plates, said means being normally spaced from both followers and adapted to be engaged thereby upon full compression of the mechanism to limit the approach of said followers; a longitudinally extending spring disposed centrally of the mechanism between said two groups of plates; and duplicate lateral-pressure-creating means at each end of the mechanism, said means cooperating with the two groups of friction plates and with the ends of said spring.

13. In a friction shock absorbing mechanism, the combination with a friction shell; of two groups of relatively movable, intercalated friction plates coacting with said shell; means for effecting relative movement of said plates; spreading means between said groups of plates for placing the same under lateral pressure, said spreading means including a wedge pressure transmitting members at opposite ends of the plates, and differential wedge members interposed between each group of plates and said wedge; pressure transmitting members; and a spring resistance.

14. In a friction shock absorbing mechanism, the combination with a friction shell; of a plurality of relatively movable intercalated friction plates coacting with said shell; means for moving said plates relatively; pressure-transmitting wedge elements associated with said means; a friction means coacting with said group of plates; friction shoes at opposite ends of the mechanism interposed between said last named means and wedge elements; and a spring resistance coacting with the shoes at the opposite ends of the mechanism.

15. In a friction shock absorbing mechanism, the combination with a friction shell;

of a plurality of relatively movable, intercalated friction plates coacting with said shell; means for producing relative movement of said plates; a wedge at each end of the mechanism associated with said means; tapering friction elements coacting with said plates; a friction shoe interposed between each wedge and element; and a spring resistance.

In witness that I claim the foregoing I have hereunto subscribed my name this 9th day of Aug. 1922.

JOHN F. O'CONNOR.